United States Patent [19]
Field

[11] Patent Number: 4,680,630
[45] Date of Patent: Jul. 14, 1987

[54] APPARATUS FOR PROCESSING DIGITAL VIDEO SIGNALS TO PRODUCE A TELEVISION IMAGE BY LINE AND FIELD SEQUENTIAL SCANNING

[75] Inventor: Anthony J. Field, Cambridge, Great Britain

[73] Assignee: U.S. Philips Corporation, New York, N.Y.

[21] Appl. No.: 775,065

[22] Filed: Sep. 11, 1985

[30] Foreign Application Priority Data

Sep. 14, 1984 [GB] United Kingdom ................. 8423323

[51] Int. Cl.4 .......................... H04N 5/14; H04N 9/75
[52] U.S. Cl. .................................... 358/160; 358/22; 358/183; 340/727; 382/46
[58] Field of Search ........................ 358/160, 183, 22; 340/727; 382/46

[56] References Cited

U.S. PATENT DOCUMENTS 4,485,402 11/1984 Searby .................................. 358/160
4,533,952 8/1985 Norman, III ....................... 358/160
4,563,703 1/1986 Taylor et al. ........................ 358/160

Primary Examiner—James J. Groody
Assistant Examiner—Michael D. Parker
Attorney, Agent, or Firm—Thomas A. Briody; William J. Streeter; Gregory P. Gadson

[57] ABSTRACT

An arrangement for rotating television pictures comprises a frame store into which a rotated input picture is written under the control of a write address generator which is in turn controlled by a rotation control and timing generator. A video input signal is applied at input and fed to a splitting circuit which produces streams of even and odd numbered samples, both at the sampling rate. These streams of samples are fed to an interpolator where they are used to generate samples to be written into the store. The store is split into four areas which are arranged to hold respectively field 1 odd samples, field 1 even samples, field 2 odd samples, and field 2 even samples. The write address generator is controlled so that samples from field 1 of the input signal are fed only into the areas of the store read by the read address generator during field 1 of the output signal and samples from field 2 of the input signal are fed only into the areas of the store read by the read address generator during field 2 of the output signal.

7 Claims, 17 Drawing Figures

APPARATUS FOR PROCESSING DIGITAL VIDEO SIGNALS TO PRODUCE A TELEVISION IMAGE BY LINE AND FIELD SEQUENTIAL SCANNING

BACKGROUND OF THE INVENTION

The invention relates to an apparatus for processing input video signals having the form of digitally encoded samples and being arranged so that successive samples produce a television picture on a display screen by line and field sequential scanning. The apparatus comprises: a field store; a first address generator for generating a set of addresses for addressing memory locations in the field store, the set of addresses being generated from input signals defining a given geometrical modification of the input television picture represented by the input video signal samples; an interpolator for receiving said input video signals and producing interpolated samples in response to said input signals defining the given geometrical modification, said first address generator being effective to assign to each sample produced by the interpolator, a memory location indicated by an address of said set of addresses; and a second address generator for generating addresses of at least a selected part of the field store to enable video signal samples to be read from the locations of the selected part of the field store to form a series of video signal samples which represent the modified television picture.

Such apparatus is disclosed in U.K. patent application No. 2119197A, where the given geometrical modification is a rotation of the television picture.

If the apparatus is used to process video signal samples representing a television picture constructed from two interlaced fields and a geometrical modification is produced which involves an input line intersecting two or more output lines, then some of the sample locations on the intersecting input lines of input field 1 will correspond to sample locations on lines of output field 2, and correspondingly, some of the sample locations on the intersecting input lines of input field 2 will correspond to sample locations on output lines of field 1. Thus, if full resolution is to be obtained, there will be a mixing of fields 1 and 2 in the output television picture. While this is satisfactory for unchanging picture information when the contents of fields 1 and 2 are identical, if there is any movement in the picture, the information content of fields 1 and 2 will be different and mixing the fields is then undesirable. One solution to this problem is to use only field 1 or field 2 information and to store that field twice. However this has the disadvantage of losing half the available input information.

SUMMARY OF THE INVENTION

It is an object of the invention to enable the provision of an apparatus for processing input video signals in which the effects of the aforementioned disadvantages are mitigated.

The invention provides an apparatus as set forth in the opening paragraph characterized in that: said apparatus further comprises a generator for producing, from the input video signal samples, samples which occur at twice the rate at which samples are written into the field store, and means for supplying the generated samples to the interpolator twice in each input line scanning period, that the field store comprises at least two parts, one part for storing odd numbered samples of each output video line of the field and the other part for storing even numbered samples of each output video line of the field; that said set of addresses generated by said first address generator comprises a first sub-set which assigns interpolated samples to the one part of the field store and a second sub-set which assigns interpolated samples to the other part of said field store; and that said apparatus still further comprises means for supplying to an output successive samples read from locations of the field store indicated by the second address generator such that successive samples at the output are derived alternately from the one part and the other part.

An apparatus as set forth in the preceding paragraph allows the horizontal resolution to be improved by interpolation between existing samples of one input field to fill horizontal sample locations in an output field where input samples exist only in the other input field. Thus, an effective increase in resolution is obtained.

Said generator may comprise a selection unit having an input for receiving said input video signal samples, a first output at which the odd numbered samples of each line are produced and a second output at which the even numbered samples of each line are produced, the samples at the first and second outputs being produced at the same rate as the samples applied to the input.

Said selection unit may comprise first and second sample memories, address generation means for generating addresses for assigning input video signal samples to successive locations of the first and second memories, said address generation means being arranged to read out the odd numbered sample locations only from the first sample memory and the even numbered locations only from the second sample memory, said odd and even numbered locations being read in parallel and at the input signal sample rate, the output of the first sample memory being connected to the first output of the selection unit and the output of the second sample memory being connected to the second output of the selection unit.

This enables input samples to be fed to the interpolator at times matching the address locations addressed by the first address generator, and by feeding odd and even numbered samples in parallel, it is possible to interpolate between odd and even numbered samples to provide the best estimate of the correct value of a sample for a given addressed location.

The interpolator may have first and second inputs connected to the first and second outputs of the selection unit respectively, said interpolator being provided with a first means for selecting the samples applied to the first input samples required to perform the interpolation, a second means for selecting from samples applied to the second input samples required for the interpolation, and means for interpolating between the samples selected by the first and second selecting means.

This enables a simple implementation of interpolator which comprises selection means for the even samples, selection means for the odd samples and selection means for selecting between odd and even samples, and then conventional interpolation means using multipliers and adders.

The television picture may comprise first and second interlaced fields, and a separate field store may be provided for each field, each field store having first and second parts.

This enables easy separation of first and second field information, with processing of the first and second fields taking place independently.

The means for supplying samples to the output may comprise an interleaving unit which interleaves samples read from the first and second parts of the field store to produce successive samples at the output, which samples are derived alternately from the first and second parts of the field store.

This enables a simple re-assembly of the output picture from the portions stored in the first and second parts of the field store. An alternative arrangement would be to modify the second address generator so that it reads alternately from each part of the store.

BRIEF DESCRIPTION OF THE DRAWINGS

An embodiment of the invention will now be described, by way of example, with reference to the accompanying drawings, in which.

DETAILED DESCRIPTION OF THE INVENTION

Video effects generators using a digital field or frame store convert an incoming analog signal into sampled digital data for storage in the frame store and signal manipulation prior or subsequent to the storage in the frame store. According to EBU standards, the sampling rate is 13.5 MHz, giving 720 samples per television line, and each sample is encoded into an 8 bit PCM code. Each field of a television picture has 288 active lines, giving a total of 576 lines in a two field interlaced frame.

The frame store comprises two field stores which are conceptually arranged in an analog of the television display picture, each field store having a 720 by 288 element array of storage locations. Consequently, the resolution in the field scanning direction is half that in the line scanning direction, the additional field scanning direction resolution being achieved by subsequently interlacing the two fields.

If the picture represented by the input video signal samples is to be manipulated to give a geometrical modification which involves lines of the input picture intersecting lines of the picture after the modification, then the difference in resolution between the line and field scanning directions in each field causes problems which result in the loss of horizontal (line scanning direction) resolution. Let it be assumed that the geometrical modification is rotated about an axis perpendicular to the plane of the picture. This rotation may be achieved by modifying the sequence of addresses used to assign memory locations of the store to input video signal samples while maintaining normal address generation to read the samples from the store. UK patent application No. 2119197A discloses an arrangement for generating addresses for assigning locations to input video signal samples to effect rotation of the television picture.

Figure 1A:
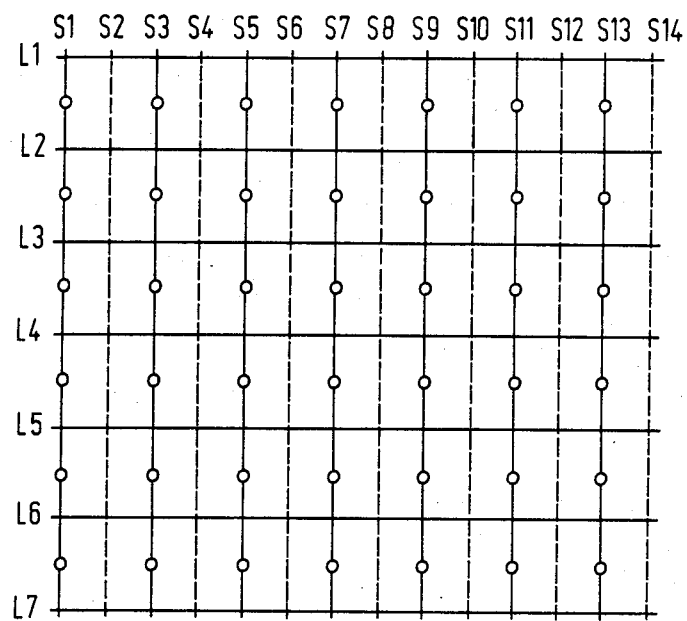
FIGS. 1A and 1B show the superimposition of input and output planes of the picture when rotated through 90° and 45° respectively, to illustrate the loss of horizontal resolution along the output lines.
Figure 1B:
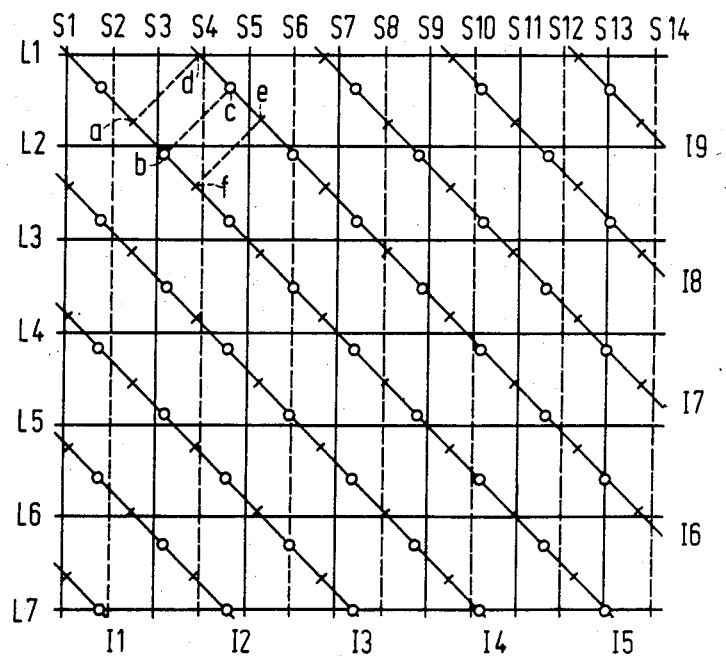

FIGS. 1A and 1B illustrate the reason for the loss of horizontal resolution when rotation is effected. FIG. 1A shows the case where the rotation takes place through 90°. Since only one field is considered, the horizontal lines L1 to L7 which represent the line scan of the output picture are spaced twice as far apart as the sample positions S1 to S14 along those lines. The solid vertical lines represent the corresponding line scans of the input picture. Consequently, odd numbered samples of the input lines lie on the lines L1 to L7 of the output picture, and the even numbered samples marked by circles lie centrally between successive lines Ii where $1 \leq i \leq 7$, where the corresponding lines L1 to L7 of the other field of the output would appear on the output picture. Thus, for the purpose of displaying this one field of the output picture, these samples are superfluous. However, for this one field, there are no input lines corresponding to the even numbered samples S2, S4, etc. of the output lines L1 to L7, which correspond to input lines of the other input field and thus comprise unusable samples for this one input field. Hence, the horizontal resolution is reduced. The reason for this is that the reduced vertical resolution of one field of the input signal has now been transferred to a reduced horizontal resolution of the output picture as a result of the rotation. This problem is overcome by producing samples for insertion into store locations corresponding to the cross points between the even numbered sample lines S2 to S14 and the lines L1 to L7 by interpolation between the odd numbered samples stored on each side of the relevant even numbered sample on the respective output line. Thus, for example, sample L1,S2 is created by interpolating between samples L1,S1 and L1,S3. Since only half of the samples are stored for each input line in the vertical direction (the circled samples are superfluous) this can be achieved in half the time normally required for storing an input line. The rest of the time can then be used for creating, by interpolation, even numbered samples for the output line which lie on the dotted vertical lines. This is, of course, the simplest case where the input samples map directly on to store locations but the principle is applicable also to other angles of rotation which will not result in such a convenient mapping of input samples into store locations. For other angles of rotation interpolation is desirable to produce an acceptable picture.

FIG. 1B illustrates the situation where a rotation through 45° is effected. The lines I1 to I9 represent the line scans of the input picture. On those input lines, the odd numbered samples are represented by crosses and the even numbered samples by circles. If input line I5 is considered, the address generator will generate a first series of addresses which assign store locations L1,S1; L2,S3; L3,S5; L4,S7; L5,S9; L6,S11; and L7,S13 to samples which are obtained by interpolation between the samples surrounding these locations. For example, for location L2,S3 the sample to be stored in that location will be generated by interpolating between samples a and b. If, however, line I5 were to be displaced to the left, then the sample for location L2,S3 would be generated by interpolation between samples a,b,c, and d. Since only half of the sample locations in the horizontal output lines are being filled, i.e. L1,S2; L2,S4 etc. are not addressed and the lines L1 to L7 are of one output field only, this will take only half an input line period. Consequently, during the rest of the input line scan period, the address generator will generate a second series of addresses which assign store locations L1,S2; L2,S4; L3,S6; L4,S8; L5,S10; L6,S12; and L7,S14 to samples which are obtained by interpolation between the samples surrounding these locations. As an example, the location L2,S4 will be assigned to a sample generated by interpolating between samples b,c,e, and f.

It can be seen therefore that where a rotation of other than 90° takes place, it is necessary to have both odd and even numbered input video samples which surround the addressed location simultaneously available to the interpolator in order to enable interpolation between odd and even samples, i.e. samples a and b, b and f of line I5 and samples d and c, c and e of line I6. The sample assigned to store location L2,S3 requires the interpolator to have access to both samples a and b of line I5, that is both an odd and an even input sample of line I5, while the sample assigned to store location L2,S4 requires the interpolator to have access to samples b and f of line I5 and c and e of line I6. Lines I5 and I6 are made available simultaneously by including a line delay in the interpolator. Thus, for writing both the odd and even numbered output line sample positions, both the odd and even numbered samples surrounding the addressed locations have to be available simultaneously, that is they have to be available twice in every input line scan period. Consequently, they have to be made available at twice the sample rate of 13.5 MHz. This is achieved in the embodiment which is further to be described by making the odd and even numbered input samples available in parallel over two paths, and providing the interpolator with separate inputs for the odd and even samples.

Figure 2:
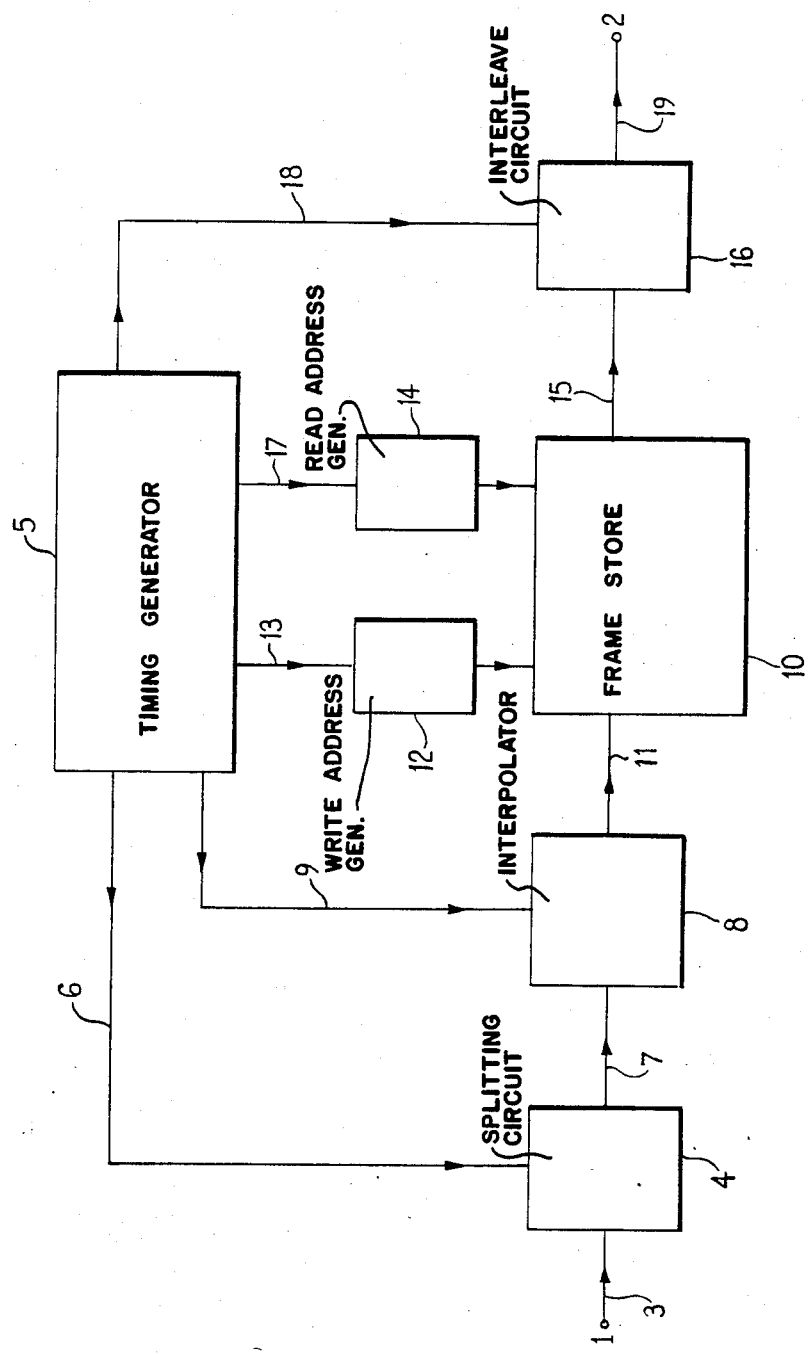
FIG. 2 shows in block schematic form, an arrangement according to the invention for processing video signals to produce a given geometrical modification.

The apparatus for processing video signals shown in FIG. 2 comprises a video signal input 1 and a video signal output 2. The video signal is in the form of digitally encoded samples at a sampling rate of 13.5 MHz for the luminance component (Y) and 6.75 MHz for the color difference components (Cr,Cb). The color difference components are multiplexed to form a single 13.5 MHz data stream comprising alternating Cr and Cb components. The video signals are formatted so that there are 720 samples in a television line scan and 288 lines in each of two interlaced fields to give a total picture content of 576 lines each of 720 picture elements.

The input video signal is fed via a path 3 to a splitting circuit 4, which produces from the input video signal two separate sample streams, one consisting of all the even numbered samples and the other consisting of all the odd numbered samples, the numbering of the samples starting from the beginning of each line scan. The action of the splitting circuit 4 is controlled by signals generated in a modification control and timing generator 5 and fed to the splitting circuit 4 via a path 6. The odd and even sample streams produced by the splitting circuit 4 are fed via a path 7 to an interpolator 8. The action of the interpolator 8 is controlled by signals generated in the modification control and timing generator 5 and fed to the interpolator 8 via a path 9. The interpolated video signal samples are fed to a digital frame store 10 via a path 11, and are written into selected positions in the frame store 10 under the control of a store write address generator 12. The store write address generator 12 is controlled by signals generated in the rotation control and timing generator 5 and fed to the address generator 12 via a line 13. Video signal samples are read out from the frame store 10 under the control of a read address generator 14 and fed via a path 15 to an interleaving circuit 16. The read address generator 14 is controlled by signals generated in the rotation control and timing generator 5 and fed via a path 17, while the interleaving circuit 16 is controlled by signals generated in the rotation control and timing generator 5 and fed via a path 18. The output of the interleaving circuit 16 is fed to the video output 2 via a path 19.

Since the store write address generator 12 is arranged to address only locations read during the output field corresponding to the input field and, in one addressing cycle, to address alternate sample locations in the output line scan direction, it is necessary to ensure that the appropriate samples are available to the interpolator 8. In the simple case of 90° rotation illustrated in FIG. 1A, only odd numbered input samples are written in field 1 and the address generator is stepped at the sample rate along the vertical lines S1 to S14. Thus, at the second sample time, the third sample value is required. This requirement can be met by splitting the incoming video signal sample stream in the splitting circuit 4 into a first stream of even numbered samples and a second stream of odd numbered samples. Thus, the odd numbered samples are supplied to one half of the interpolator 8 twice during each line scan period and the even numbered samples are supplied to the other half of the interpolator 8 twice during each line scan period. In this way, the required sample can be generated and written into the location addressed by the store address generator 12. A similar situation exists for rotations of other than 90°, but in this case both horizontal and vertical counters of the address generator may be incremented, and interpolation between odd and even numbered samples may be required. Thus, it is necessary to have access at all times to both odd and even numbered samples surrounding an addressed store location in the interpolator 8. For the 90° rotation case it is only necessary to have access to the odd numbered samples during the first cycle of the address generator and to interpolate between odd numbered samples of successive lines during the second cycle in the first field. Similarly, for the second field, only even numbered samples are required.

Figure 3:
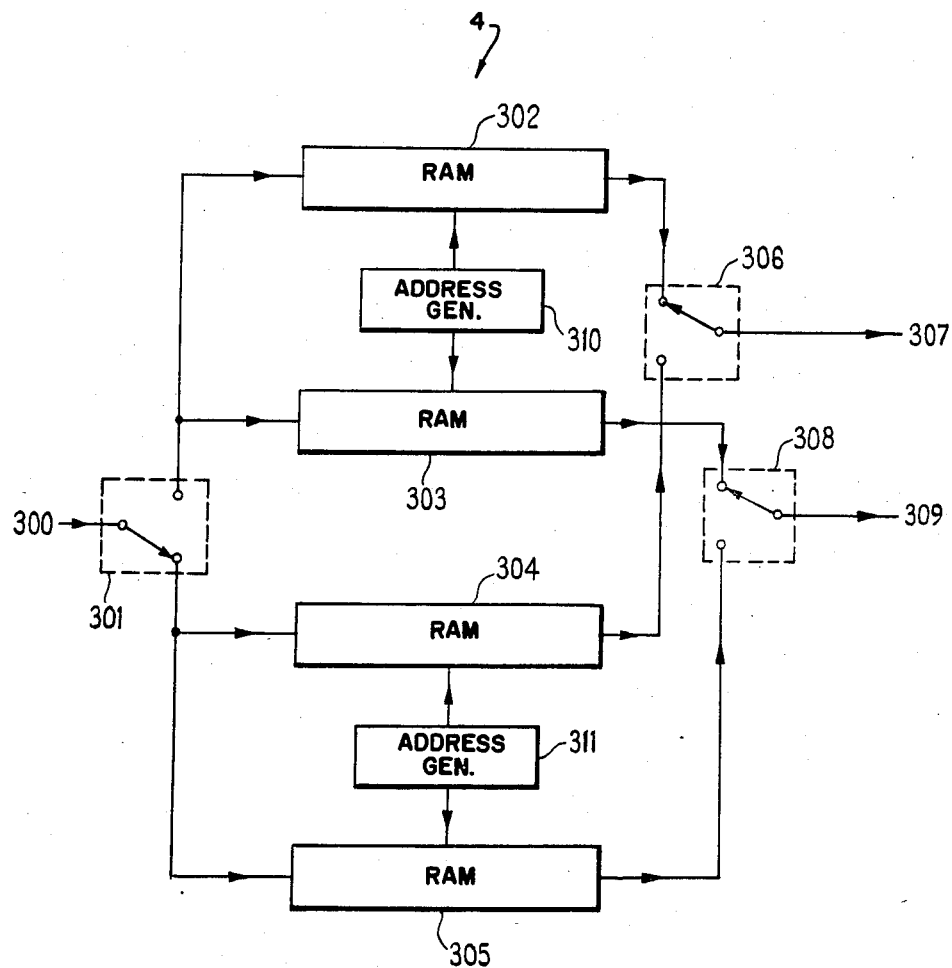
FIG. 3 shows an embodiment of a splitting circuit suitable for use in the arrangement shown in FIG. 2.

FIG. 3 shows the splitting circuit 4 which comprises an input 300, which is connected to the pole of a changeover switch 301. In one state, the changeover switch 301 connects the input 300 to first and second banks of random access memory (RAM) 302 and 303 while in its other state, it connects the input 300 to third and fourth banks of RAM 304 and 305. A second changeover switch 306 has its pole connected to a first output 307 and in one state connects the RAM 302 to the first output 307 and in its other state, connects the RAM 304 to the first output 301. A third changeover switch 308 has its pole connected to a second output 309, and in its first state, connects the RAM 303 to the second output 309 and in its second state, connects the RAM 305 to the second output 309. A first address generator 310 is connected to the RAMs 302 and 303 while a second address generator is connected to the RAMs 304 and 305.

In operation, video signal samples are applied to input 300 and are routed to either the RAMs 302 and 303 or to the RAMs 304 and 305 in dependence on the state of the changeover switch 301. The changeover switch 301 is controlled to change state between each line so that samples are written into RAMs 302 and 303 during one line and into RAMs 304 and 305 during the next line. This is achieved by means of pulses generated in the timing generator 5 which occur during each line blanking period. Pulses occurring during the line blanking periods are also applied to the switch 306 and 308 and to the address generators 310 and 311. Thus, for example, during odd numbered lines input samples are written into the RAMS 302 and 303 and output samples are written into the RAMs 304 and 305 and fed to outputs 307 and 309 respectively, while during even numbered lines input samples are written into the RAMs 304 and 305 and output samples are read from the RAMs 302 and 303 and fed to outputs 307 and 309 respectively.

The address generators 310 and 311 are arranged to write each input sample into successive RAM locations when set to the write mode, but to read alternate samples only from each RAM such that only odd numbered samples are read from RAMS 302 and 304 and only even numbered samples are read from RAMs 303 and 305. Thus, output 307 receives only odd numbered samples, and output 309 receives only even numbered samples. To achieve this, the RAM read and write enable inputs are fed with signals which change state on alternate lines. This can be produced by causing bistable circuits to toggle when fed by a pulse which occurs during the line blanking interval The read addressing is arranged to miss alternate locations so that only odd or even samples are read depending on the start position of the address counters which are part of the address generators 310 and 311.

Figure 4:
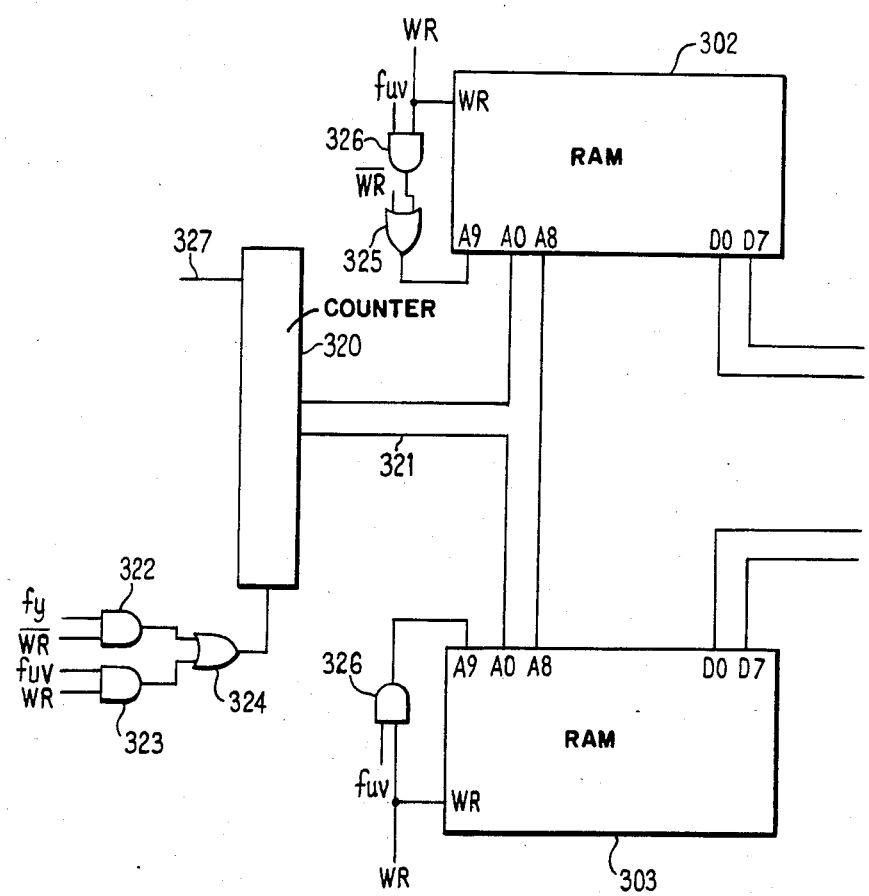
FIG. 4 shows an addressing scheme suitable for use in the splitting circuit of FIG. 3.

One form the address generator 310 may take is shown in FIG. 4. The RAMs 302 and 303 have ten address inputs A0 to A9 and eight data input/outputs D0 to D7 and an input WR to which a signal is applied to determine whether information is to be written into the RAM or read out from the RAM. Bits A0 to A8 of the RAM address are generated by means of a counter 320 whose outputs are fed to the RAMS 302 and 303 via an address bus 321. The counter is clocked during the write cycle by means of a clock at half the sample rate (i.e. 6.75 MHz), and during the read sample by means of a clock at the sample rate (i.e. 13.5 MHz). This is achieved by means of two AND gates 322 and 323 whose outputs ar fed to an OR gate 324, the output of the OR gate 324 being connected to the clock input of the counter 320. The inputs of AND gate 322 are fed with the sample rate clock fy and a signal $\overline{WR}$, which is the read instruction to the RAMS 302 and 303, while the inputs of AND gate 323 are fed with a clock signal $f_{uv}$ which is at half the sample rate and a signal WR, which is the write instruction to RAMS 302 and 303. The signals WR and $\overline{WR}$ are the inverse of each other. The tenth address bit A9 (the least significant one) of the RAMs 302 and 303 is generated by a combination of the WR, $\overline{WR}$ and $f_{uv}$, signals. The output of an OR gate 325 is connected to the A9 address input of the RAM 302, the B first input of the OR gate 325 having the signal $\overline{WR}$ applied to it, while the second input is connected to the output of an AND gate 326 having a first input to which the signal $f_{uv}$ is applied, and a second input to which the signal WR is applied. The RAM 302, from which only the odd samples are read, is fed by either the $\overline{WR}$ signal when samples are being read out or by the WR and $f_{uv}$ signals when samples are being written in. When samples are written into the store, WR=1 and $\overline{WR}$=0. The signal produced at the output of OR gate 325 is thus formed by $f_{uv}$, and thus address bit A9 is also formed by $f_{uv}$, i.e. in a first half period of the signal $f_{uv}$, when the signal level is for example, high, the bit value of A9=1 and in the second half period of $f_{uv}$, when the signal level is low, A9=0. The least significant address bit A9 thus changes at the sample rate, while the address bits A0–A8 change at half the sample rate when samples are written into RAM 302. The whole address A0–A9 thus changes at the sample rate, and all the samples of a line are written into the RAM 302.

When samples are read out the store, WR=0 and $\overline{WR}$=1. The signal produced at the output of AND gate 326 is' thus always equal to "0", and the signal produced at the output of OR gate 325 is always equal to "1". Consequently, A9=1, and thus the least significant bit of the address for RAM 302 is permanently set when reading samples from the store. Consequently, while all the samples of a line are written into the store 302, only the odd numbered samples are read out.

Since the RAM 303 is required to produce even numbered samples only at its output, the tenth address bit A9 is supplied with the signal WR, by means of a two input AND gate 326 whose output is connected to the A9 address input. Thus when WR is at a logical "0", i.e. when information is to be read from the RAM 303, the tenth address bit A9 will be held at a logical "0", thus causing only the even numbered samples to be read out.

The counter is reset at the start of each line by a line blanking pulse generated in the timing generator 5 and applied to the counter via a line 327. The streams of odd and even numbered samples produced at outputs 307 and 309 are fed to corresponding inputs of the interpolator 8.

As already mentioned, during read out ($\overline{WR}$=1) the sample rate frequency (13.5 MHz) is fed (via AND gate 322) to the counter 320. Thus during read out the address bits A0–A8 change at the sample rate frequency (while during write in, they changed at half the sample rate frequency) while A9 is permanently set. The consequence thereof is that during the scanning period of one video line, the contents of the RAMs 302 and 303, are read out twice. Thus the splitting circuit 4 supplies samples to the interpolator at twice the rate at which they are supplied to the apparatus. Within the scanning period, a same sample can therefore be supplied twice to the interpolator.

The second address generator 311 and the RAMs 304 and 305 operate in the same manner as the first address generator 310 and the RAMs 302 and 303.

Figure 5:
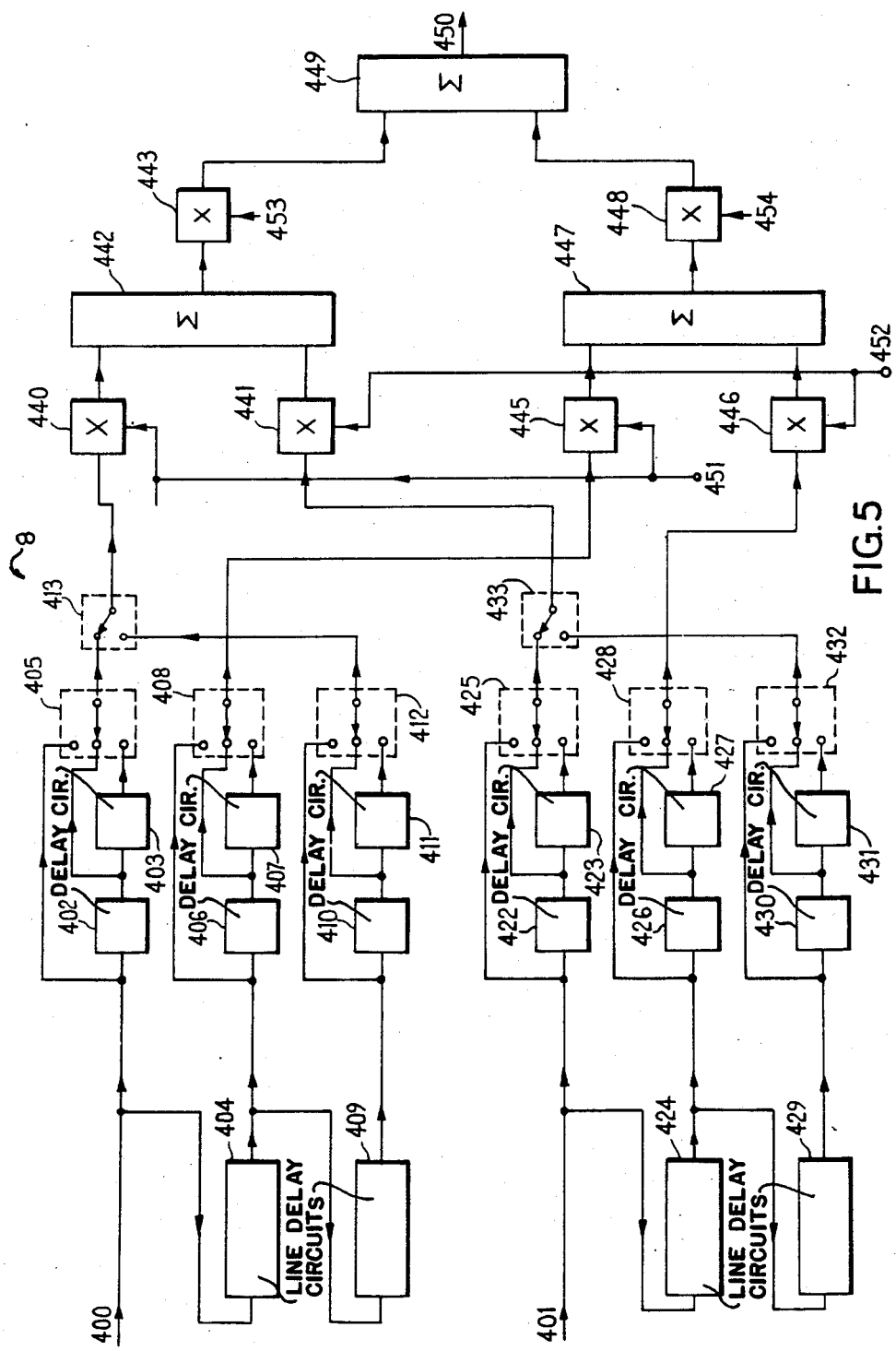
FIG. 5 shows an embodiment of an interpolator suitable for use in the arrangement of FIG. 2.

FIG. 5 shows an interpolator suitable for use as the interpolator 8. The interpolator shown in FIG. 5 has first and second inputs 400 and 401 for receiving the samples produced by the splitting circuit 4, input 400 for receiving even numbered samples and input 401 for odd numbered samples. Input 400 is connected to the input of a first of two serially connected one element delay circuits 402 and 403, to the input of a one line delay circuit 404, and to a first input of a three way selection switching arrangement 405. The output of the first one element delay circuit 402 is connected to a second input of the switching arrangement 405, while the output of the second one element delay circuit 403 is connected to a third input of the switching arrangement 405. The output of the one line delay circuit 404 is connected to the input of a first of two serially connected one element delay circuits 406 and 407, to a first input of a three way selection switching arrangement 408, and to the input of a one line delay circuit 409. The output of the first one element delay circuit 406 is connected to a second input of the switching arrangement 408, while the output of the second one element delay circuit 407 is connected to a third input of the switching arrangement 408. The output of the one line delay circuit 409 is connected to the input of a first of two serially connected one element delay circuits 410 and 411, and to a first input of a three way selection switching arrangement 412. The output of the first one element delay circuit 410 is connected to a second input of the switching arrangement 412 while the output of the second one element delay circuit 411 is connected to a third input of the switching arrangement 412. The pole of switching arrangement 405 is connected to a first input of a changeover switching arrangement 413 while the pole of switching arrangement 412 is connected to the second input of the switching arrangement 413.

Input 401 is connected to an identical arrangement of one element delay circuits 422, 423, 426, 427, 430, and 431; one line delay circuits 424 and 429; and three way selection switching arrangements 425, 428, and 432, and changeover switching arrangement 433.

The pole of changeover switching arrangement 413 is connected to a first input of a multiplier 440, while the pole of changeover switching arrangement 433 is connected to a first input of a multiplier 441. The outputs of the multipliers 440 and 441 are fed to first and second inputs of a summing circuit 442 whose output is fed to a first input of a multiplier 443. The pole of selection switching arrangement 408 is fed to a first input of a multiplier 445 while the pole of selection switching arrangement 428 is fed to a first input of a multiplier 446. The outputs of multipliers 445 and 446 are fed to first and second inputs of a summing circuit 447 whose output is fed to a first input of a multiplier 448. The outputs of the multipliers 443 and 448 are fed to first and second inputs of a summing circuit 449 whose output provides an interpolated sample at an output 450 for writing into the appropriate frame store location. The second inputs of the multipliers 440 and 445 are conected to an input 451 while the second inputs of the multipliers 441 and 446 are connected to an input 452. The signals at inputs 451 and 452 are horizontal interpolation co-efficients which are obtained from the modification control and timing generator 5 in a manner which will be described hereinafter. The second input of the multiplier 443 is connected to an input 453 while the second input of the multiplier 448 is connected to an input 454. The signals at inputs 453 and 454 are vertical interpolation co-efficients which are obtained from the modification control and timing generator 5 in a manner which will be described hereinafter.

The signals at inputs 451 and 452 are derived from output 98 of the hardware calculator which is described hereinafter with reference to FIGS. 11 to 13 and are such that if the input value at input 451 is A and that at 452 is B, then A and B have the relationship $A=1-B$. Similarly, the signals at inputs 453 and 454 are derived from output 99 of the hardware calculator and are such that if the input value at input 453 is C and that at 454 is D then C and D have the relationship $C=1-D$.

The relationship $A=1-B$, respectively $C=1-D$ is imposed by the fact that the fractions A, B or C, D taken from the input samples have to form a unity $(A+B=1; C+d=1)$ in order to form a complete interpolated sample. At the inputs 451 and 452 there are supplied horizontal interpolation coefficients, while at the inputs 453 and 454 there are supplied vertical interpolation coefficients. The interpolation coefficients are determined on the basis of the given geometrical modification to be applied on the television picture.

The interpolator shown in FIG. 5 is thus able to operate in parallel on the odd samples (supplied at input 401) and the even samples (supplied at input 400). The odd and the even samples are supplied simultaneously to the interpolator, and at twice the sample rate. Consequently, sufficient data is supplied to the interpolator at the correct instants to enable the interpolator to generate interpolated samples to form a television picture for a geometrically modified input picture having the maximum resolution obtainable from the input video sample information.

The selection switching arrangements 405, 408, 412 are controlled such that they each select a signal delayed by the same number of element delays, i.e. the switching arrangements are ganged. Similarly the selection switching arrangements 425, 428, 432 are ganged and so are the changeover switching arrangements 413, 433. Thus the total delay from the input 400 to the first input of the multiplier 440 is equal to the number of element delays selected by the selection switching arrangement 405 when the changeover switch 413 is in the state shown or the number of element delays selected by the selection switching arrangement 412 (which is the same as the number selected by the selection switching arrangement 405) plus two line delays when the changeover switch 413 is in the opposite state.

Figure 6:
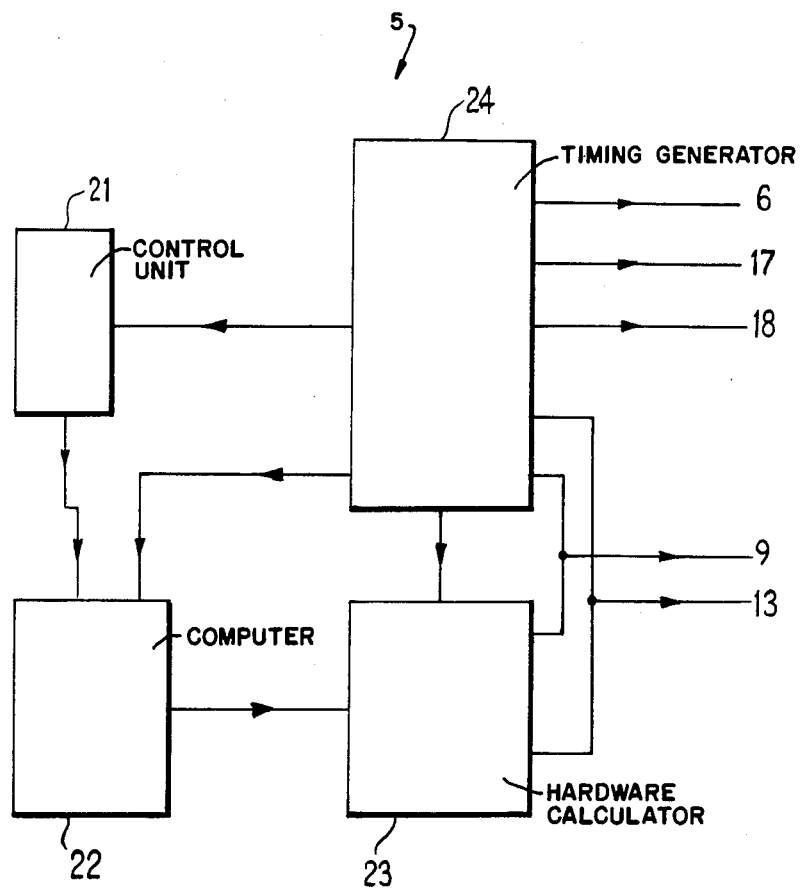
FIG. 6 shows an embodiment of a rotation control and timing generator suitable for use in the arrangement of FIG. 2.

FIG. 6 shows in block schematic form, the modification control unit and timing generator 5. The generator 5 comprises a control unit 21 which may contain selection switches, control potentiometers, and analogue to digital converters to produce control signals which are fed to a computer 22. The control unit 21 produces signals to specify the geometrical modification to be applied to the input television picture. The computer 22 together with a hardware calculator 23 produce control signals for the store write address generator 12 and the video signal interpolator 8. A timing generator 24 feeds timing signals to the control unit 21, computer 22 and hardware calculator 23, and comprises a clock and dividing and decoding circuits which produce clock signals at the sampling frequency and desired submultiples thereof and line and frame blanking pulses. The timing generator 24 and hardware calculator 23 produce signals to control the operation of the interpolator 8 and store write address generator 12.

In this specification a geometrical modification formed by a rotation of the picture about an axis perpendicular to the plane of the picture will be referred to as rotation, while a rotation of the picture about an axis parallel to the plane of the picture will be referred to as perspective. While in principle, the axes parallel to the plane of the picture may extend in any direction in the following description, it will be assumed that these axes are horizontal and vertical.

The control unit 21 provides signals to the computer 22 which specify the point about which rotation is to take place (center of rotation) and the point about which perspective is to take place (center of perspective). Further, the angles of rotation and perspective are set by the control unit 21. The centers of rotation and pespective may be set by means of a conventional cursor control while the angles of rotation and perspective may be set by switches or, if continuous resolution is desired, potentiometer control. The form and construction of such control units is well known to those skilled in the art.

Figure 7:
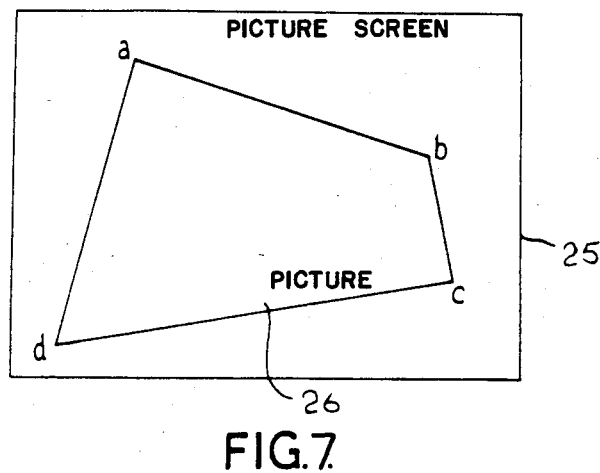
FIG. 7 shows the outline of a rotated picture on a television screen.

FIG. 7 shows a television picture screen 25 on which the outline of a picture 26 which has been rotated about axes parallel to the screen and, optionally, about an axis perpendicular to the screen is shown. The computer 22 determines from the centers of rotation and perspective and the three angles of rotation about the three axes, the positions of the points a,b,c, and d which define the corners of the rotated picture.

The co-ordinates of the corners of the rotated pictures are obtained by multiplying the co-ordinates of the corners of the original picture by a rotational matrix. Matrices necessary to determine co-ordinates of a rotated (or a translated) picture are given in Chapter 22 of the second edition of the book entitled "Principles of Interactive Computer Graphics" by W. M. Newman and R. F. Sproull, published by McGraw-Hill Inc. 1979.

The field store 10 is arranged as an analog of the picture screen, and contains 720 locations for storing picture samples of each of 576 lines, i.e. 720×576 locations. Thus any store location can be considered to have co-ordinates (x,y) defining the position at which that sample will be displayed and starting from (0,0) in the top left hand corner and ranging to (719,575) in the bottom right hand corner. These co-ordinates are referred to as being in the output plane. The picture received from the picture source 6 will likewise consist of 720 samples per line and 576 lines per frame. When perspective is performed, these samples have to be compressed to fit within a picture frame such as that shown as 26 in FIG. 7. Thus it is necessary to convert each input sample point within the picture frame 26 to co-ordinates relating to the output plane.

Figure 8:
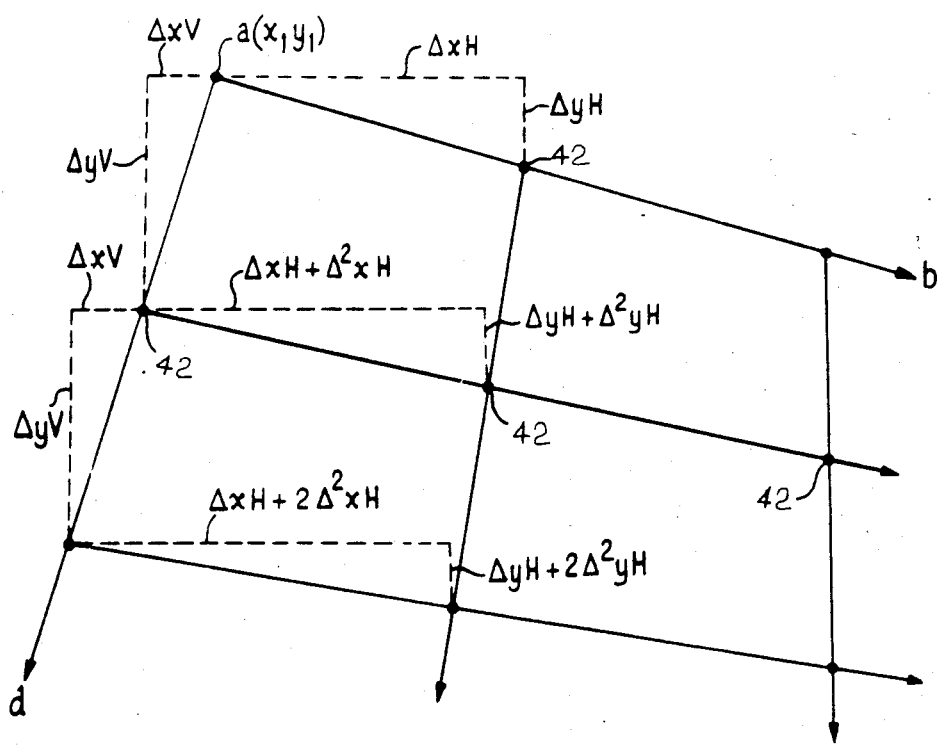
FIG. 8 shows on an enlarged scale, a portion of the rotated picture of FIG. 7 to illustrate the location of samples in the input plane, and a method of traversing the samples in the output plane.

Referring to FIGS. 7 and 8 and given the four points $a(x_1, y_1)$, $b(x_2, y_2)$, $c(x_3, y_3)$, and $d(x_4, y_4)$ defined by a perspective projection, incremental terms $\Delta xH$ and $\Delta yH$ can be derived which allow the line ab (a horizontal input line) to be traversed in the output plane.

$$\left. \begin{array}{l} \text{Thus } \Delta xH = (x_2 - x_1)/m \\ \Delta yH = (y_2 - y_1)/m \end{array} \right\} \quad 1$$

where m is the number of picture elements per line.

Similarly for line ad $$\left. \begin{array}{l} \Delta xV = (x_4 - x_1)/n \\ \Delta yV = (y_4 - y_1)/n \end{array} \right\} \quad 2$$

where n is the number of lines per frame.

By considering the incremental values $\Delta xH'$ and $\Delta yH'$ along cd, the change of increments for sequential horizontal lines can be derived as follows.

$$\text{From } dc \; \Delta xH' = (x_3 - x_4)/n \\ \Delta yH' = (y_3 - y_4)/n$$

$$\left. \begin{array}{l} \text{Thus } \Delta^2 xH = (\Delta xH - \Delta xH')/n \\ \Delta^2 yH = (\Delta yH - \Delta yH')/n \end{array} \right\} \quad 3$$

where $\Delta^2 xH$ and $\Delta^2 yH$ are the changes in increments $\Delta xH$ and $\Delta yH$ with sequential input lines.

From which the increments to traverse any horizontal line $$\left. \begin{array}{l} \Delta x'H = \Delta xH + y_n \Delta^2 xH \\ \Delta y'H = \Delta yH + y_n \Delta^2 yH \end{array} \right\} \quad 4$$

where $y_n$ is the horizontal line number starting from zero at line ab.

Similarly, by considering the incremental values along bc the change of increments for picture elements along the horizontal lines $\Delta^2 xV$ and $\Delta^2 yV$ can be derived $$\left. \begin{array}{l} \Delta^2 xV = (\Delta xV' - \Delta xV)/m \\ \Delta^2 yV = (\Delta yV' - \Delta yV)/m \end{array} \right\} \quad 5$$

$$\left. \begin{array}{l} \text{Hence } \Delta x'V = \Delta xV + x_n \Delta^2 xV \\ \Delta y'V = \Delta yV + x_n \Delta^2 yV \end{array} \right\} \quad 6$$

where $x_n$ is the picture element number starting from zero at line ad.

By combining equations (4) and (6) with the starting point $x_1$, $y_1$, the values of co-ordinates $x'$, $y'$ of any input picture element in the output plane can be determined.

$$x' = x_1 + y_n \Delta xV + x_n(\Delta xH + y_n \Delta^2 xH)$$

$$y' = y_1 + y_n \Delta yV + x_n(\Delta yH + y_n \Delta^2 yH).$$

FIG. 8 illustrates a number of picture elements 42 of the input picture signal in the rotated input plane starting from the point a and the incremental additions to define their co-ordinates in the output plane.

Figure 9:
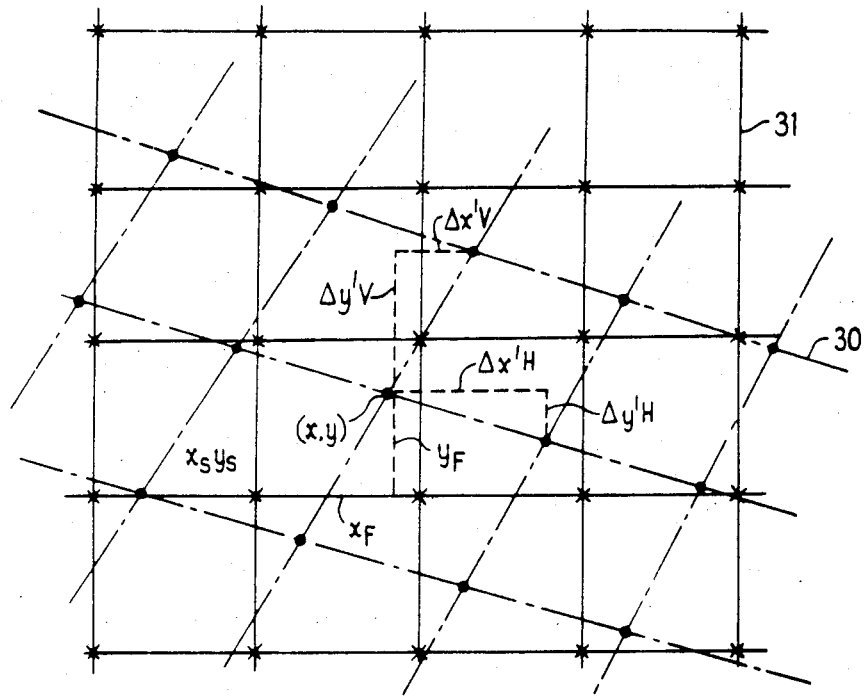
FIG. 9 shows the superimposition of the input and output planes.
Figure 10:
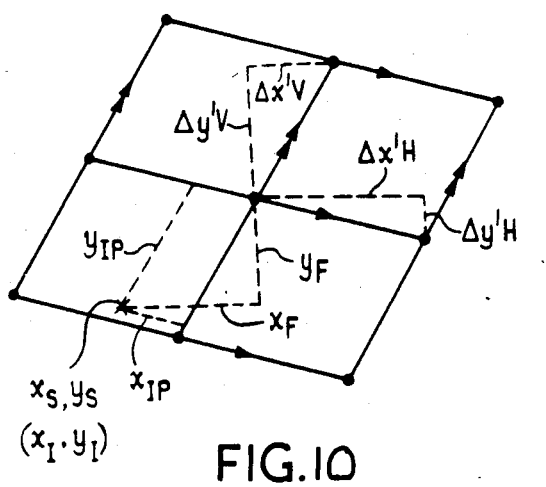
FIG. 10 illustrates assumptions made for interpolation of the input signal.

Consider now the integer part of $x'$ as $x^I$, and the integer part of $y'$ as $y^I$. These represent $x'$ and $y'$ truncated to fit the possible output plane positions. The integer parts $x^I$ and $y^I$ give the address for the field store, while the fractional remainders $x_F$ and $y_F$ give the distance from $x'$, $y'$ of the addressed point in the output plane. FIG. 9 illustrates this construction with the input plane 30 shown by chain dotted lines and the output plane 31 by solid lines. In order to provide the interpolator 8 with the necessary co-efficients, it is necessary to convert from output plane co-ordinates to input plane co-ordinates. To achieve this, it is assumed that over the small area over which interpolation takes place, adjacent lines are parallel and adjacent sample positions are parallel, i.e. that four adjacent sample positions in the input plane are at the corners of a parallelogram. FIG. 10 illustrates the assumptions made in deriving the equations. In practice the angle between two adjacent lines is always less than $\frac{1}{2}°$. Thus, the interpolator positions $x_{Ip}$ and $y_{Ip}$ are defined by $$x_{Ip} = (y_F \Delta x'V - x_F \Delta y'V)/(\Delta y'V \cdot \Delta x'H - \Delta x'V \cdot \Delta y'H)$$

$$y_{Ip} = -(y_F \Delta x'H - x_F \Delta y'H)/(\Delta y'V \cdot \Delta x'H - \Delta x'V \cdot \Delta y'H)$$

Since the transformation of input points to the output plane in areas of compression is being considered, values of $x_{Ip}$ and $y_{Ip}$ greater than one will be obtained in some instances. These values indicate that these positions are redundant and they are consequently discarded.

Thus, the computer 22 produces once per frame, ten parameters $x_1$, $y_1$, $\Delta xH$, $\Delta yH$, $\Delta^2xH$, $\Delta^2yH$, $\Delta xV$, $\Delta yV$, $\Delta^2xV$, and $\Delta^2yV$, and supplies them to the hardware calcultor 23. The calculator 23 then provides at the picture element rate $x^I$ and $y^I$ to the store write control unit and $x_{Ip}$ and $y_{Ip}$ to the interpolator 8.

Figure 11:
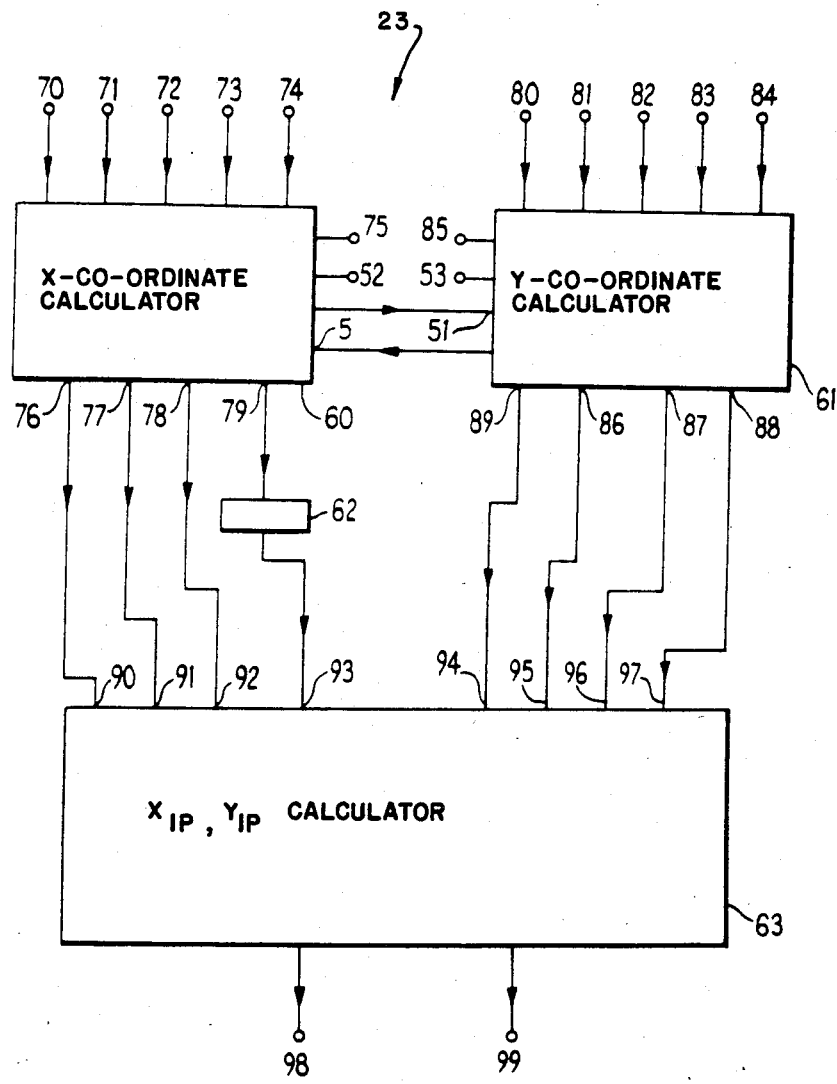
FIG. 11 illustrates in block schematic form, the hardware calculator of FIG. 6.

The hardware calculator 23 is shown in block schematic form in FIG. 11, and comprises first and second identical blocks 60 and 61, an inverter 62 and a third block 63. The block 60 has five inputs 70 to 74 to which the parameters $\Delta xH$, $\Delta^2xH$, $\Delta^2xV$, $\Delta xV$ and $x_1$ respectively are applied by the computer 2 while the block 61 has five inputs 80 to 84 to which the parameters $\Delta yH$, $\Delta^2yH$, $\Delta^2yV$, $\Delta yV$, and $y_1$ respectively are applied by the computer 2. The block 60 has five outputs 75 to 79 which provide the calculated values $x^I$, $x_F$, $\Delta x'H$, $\Delta x'V$, and $\Delta x'V \cdot \Delta y'H$, while the block 61 has five outputs 85 to 89 which provide the calculated values $y^I$, $y_F$, $\Delta y'H$, $\Delta y'V$, and $\Delta x'H \cdot \Delta y'V$. The block 60 has a further input 50 to which the calculated value of $\Delta y'H$ is applied, while the block 61 has a further input 51 to which the calculated value of $\Delta x'H$ is applied. The block 60 has a further output 52 which provides an instruction to the sample address counter in the store write control 4 to increment or decrement at the sample rate, while the block 61 has a further output 53 which provides an instruction for the line address counter to increment or decrement at the sample rate. It should be noted that the outputs $x^I$ and $y^I$ set the starting points for the address counters at the start of each line.

The block 63 has eight inputs 90 to 97 to which are connected $x_F$, $\Delta x'H$, $\Delta x'V$, the output of inverter 62 ($\Delta x'V \cdot \Delta y'H$), ($\Delta x'H \cdot y'V$), $y_F$, $\Delta y'H$, and $\Delta y'V$ respectively. The block 63 has two outputs 98 and 99 at which the calculated values of $x_{Ip}$ and $y_{Ip}$ respectively are available.

Figure 12:
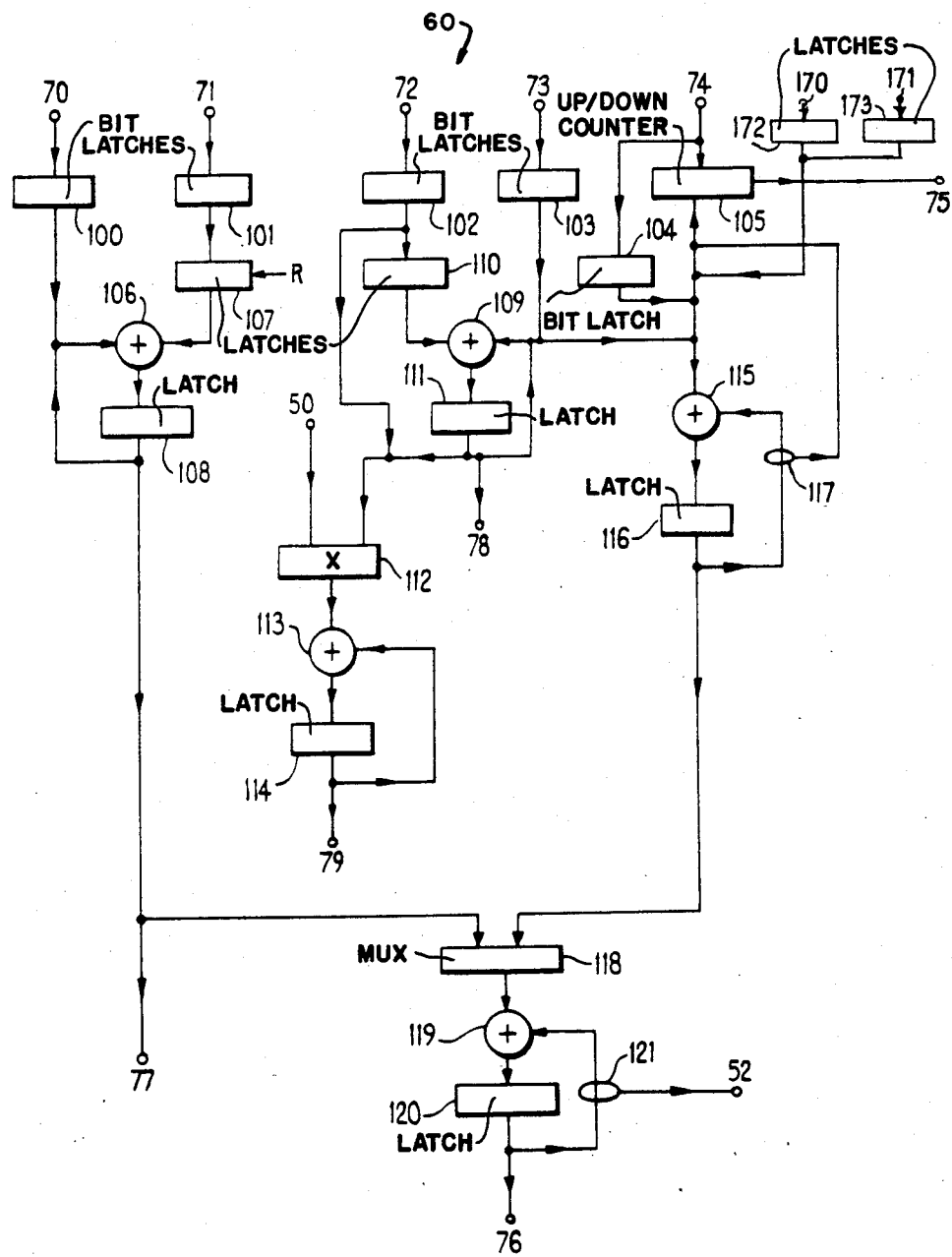
FIG. 12 shows a part of the hardware calculator of FIG. 11 in greater detail.

FIG. 12 shows an embodiment of the block 60. The block 61 is identical to the block 60 and thus will not be separately described, it being sufficient to note that block 60 calculates the x co-ordinates while block 61 calculates the y co-ordinates.

As shown in FIG. 12, the inputs 70 to 74 are connected to respective 12 bit latches 100 to 104, these latches having tri-state outputs. The input 74 is also connected to pre-setting inputs of an up/down counter 105. The information at inputs 70 to 74 is clocked into the latches and counter during the field blanking interval. The information presented by the computer 22 at the input 74 is split into an integer portion which is fed to the counter 105, and a fractional portion which is fed to the latch 104. Alternatively, separate inputs may be provided for the integer and fractional portions of $x_1$. The output of the latch 100 is connected to a first input of an adder 106, while the output of the latch 101 is connected to a latch 107 whose output is connected to a second input of the adder 106. The latch 107 is resetable to zero by the application of a reset signal (R). The output of the adder 106 is connected to the input of latch 108, which has a tri-state output which is connected to the first input of the adder 106 and to the output 77. For the first line the output of latch 100 is enabled and that of latch 107 set to zero, and hence the contents of latch 100 are read into latch 108. The output of latch 100 is then disabled until the start of the next field while the output of latch 108 is enabled to produce the value $\Delta x'H$ at output 77 and at the first input of the adder 106. The contents of latch 101 are read into the latch 107 and $\Delta^2xH$ is added to the contents of latch 108 at the line rate by appropriate clocking of the inputs of latch 108. A similar arrangement is formed by latches 102 and 103 together with an adder 109, a latch 110 which has outputs pre-settable to zero, and a latch 111 having tri-state outputs. This produces the value $\Delta x'V$ at output 78, but in this case, the latch 111 is clocked at the picture element rate. The outputs of latches 102 and 111 are also connected to a first input of a multiplier 112 whose second input is connected to input 50 which receives the value $\Delta y'H$ from the unit 61. The output of the multiplier 112 is accumulated in an arrangement comprising an adder 113 and a latch 114 whose output is presettable to zero and which B is clocked at the picture element rate so that the latch 114 contains the value ($\Delta x'V \cdot \Delta y'H$), the output of latch 114 being connected to output 79.

The outputs of latches 103 and 104 are connected to a first input of an adder 115, which together with a latch 116 having its output presettable to zero, forms an accumulator. The fractional part of $x_1$ is entered into the accumulator at the start of a field, and the value of $\Delta xV$ is added at the line rate. The contents are monitored 117 to determine when the added fractional values add to the next integer (up or down), and an output is produced to increment or decrement the counter 105 which sets the position from which the sample counter in the store write control unit 4 starts each line.

The outputs of latches 108 and 116 are fed to first and second inputs of a multiplexer 118, which selects the output of latch 116 to feed to an accumulator which comprises an adder 119 and a latch 120 which has outputs resettable to zero at the start of each line. The multiplexer then connects the output of latch 108 to the accumulator, which is clocked at the picture element rate. The output of the accumulator is monitored 121 and the output 52 activated to present increment or decrement signals to the sample address counter in the store write address generator 12. The output of the latch 120 is fed to output 76 as the value $x_F$.

It should be noted that the values $\Delta xH$, $\Delta^2xH$, $\Delta xV$, $\Delta^2xV$, and $x_F$ may be positive or negative and hence the accumulators may increment or decrement. Thus, the output values of outputs 75 and 52 may be such that the address counters in the store write address generator are caused to increment or decrement.

The latches 100, 101, 102, 103 108, and 111 may be formed by standard TTL type 74LS374 integrated circuits, the input values being in 12 bit parallel form, while the latches 107,110,114,116, and 120 may be type 74LS273 integrated circuits and the counter 105 a type 74LS191 integrated circuit. A suitable circuit for the multiplier 112 is that sold by TRW Inc. under the type reference MPY112K while the adders may be formed from type 74LS283 integrated circuits.

The hardware calculator, as so far described, is identical to that disclosed in U.K. patent application No. 8410709. In order to control the store write address generator 12 so that samples from each field are written into the correct part of the store two further inputs 170 and 171 are provided which are stored by latches 172 and 173 and read into the accumulator formed by adder 115 and latch 116 at the beginning of the first and the second cycle respectively. The inputs cause the position of the store location addressed to be advanced and retarded by half a store position horizontally respectively.

Figure 13:
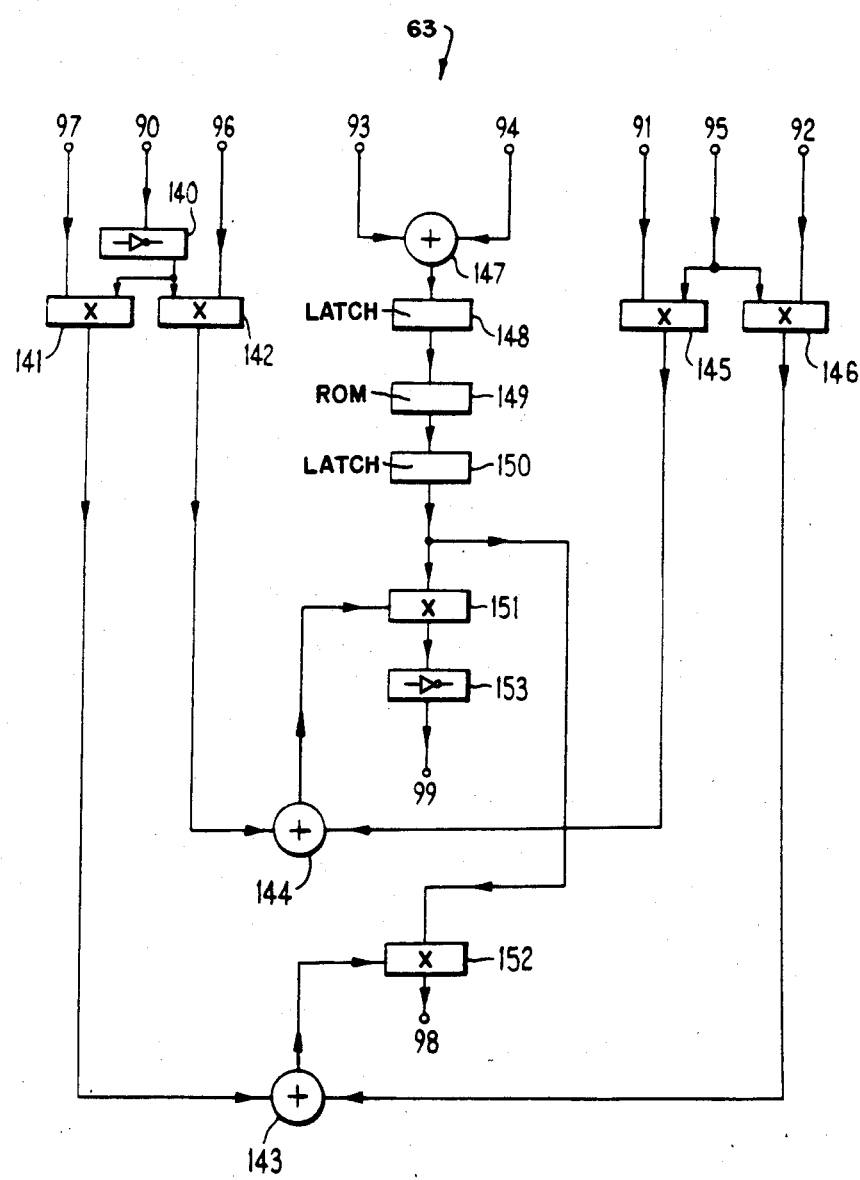
FIG. 13 shows a further part of the hardware calculator of FIG. 11 in greater detail.

FIG. 13 shows an embodiment of the block 63 which calculates $x_{Ip}$ and $y_{Ip}$ from inputs $x_F$, $\Delta x'H$, $\Delta x'V, y_F$, $$\frac{(\Delta y'H, \Delta y'V),}{(\Delta x'V \cdot \Delta y'H),}$$

and ($\Delta x'H \cdot \Delta y'V$). The value $x_F$ is applied to input 90 and inverted by an inverter 140 whose output is connected to a first input of each of two multipliers 141 and 142. The value $\Delta y'V$ is applied to the second input of multiplier 141 via input 97, while the value of $\Delta y'H$ is applied to the second input of multiplier 142 via input 96. The multiplier 141 produces the value $(-x_F \cdot \Delta y'V)$ at its output, and this is applied to a first input of an adder 143. The multiplier 142 produces the value $(-x_F \cdot \Delta y'H)$ at its output and this is applied to a first input of an adder 144. Similarly, the value $y_F$ is applied via input 95 to a first input of each of two multipliers 145 and 146. The value of $\Delta x'H$ is applied via input 91 to the second input of multiplier 145 while the value of $\Delta x'V$ is applied via input 92 to the second input of multiplier 146. The multiplier 145 produces the value $(y_F \cdot \Delta x'H)$ at its output, and this is applied to the second input of the adder 144. Similarly the multiplier 146 produces the value $(y_F \cdot \Delta x'V)$ at its output and this is applied to the second input of the adder 143.

The value $\overline{(\Delta x'V \cdot \Delta y'H)}$ is fed via input 93 to the first input of an adder 147 while the value $(\Delta y'V \cdot \Delta x'H)$ is fed via input 94 to the second input of the adder 147. The adder produces the value ($\Delta y'V \cdot \Delta x'H - \Delta x'V \cdot \Delta y'H$) at its output and this is fed to a latch 148 whose output addresses a read only memory 149 which is programmed to convert the value ($\Delta y'V \cdot \Delta x'H - \Delta x'V \cdot \Delta y'H$) to $1/(\Delta y'V \cdot \Delta x'H - \Delta x'V \cdot \Delta y'H)$. This value is fed via a latch 150 to a first input of a multiplier 151, and to a first input of a multiplier 152. The output of the adder 144 is fed to the second input of the multiplier 151, while the output of the adder 143 is fed to the second input of the multiplier 152. The output of multiplier 152, which is the value $(y_F \cdot \Delta x'Y - x_F \cdot \Delta y'Y)/(\Delta y'V \cdot \Delta x'H - \Delta x'V \cdot \Delta y'H)$, is applied to output 98 as the value $x_{Ip}$, while the output of the multiplier 151 is inverted in an inverter 153 to produce a value $-(y_F \cdot \Delta x'H - x_F \cdot \Delta y'H)/(\Delta y'V \cdot \Delta x'H - \Delta x'V \cdot \Delta y'H)$, which is applied to output 99 as the value $y_{Ip}$.

The multipliers 141, 142, 145, 146, 151 and 152 may be those sold by TRW Inc. under the type reference MPY08HUJ, since the values are truncated to 8 bits before multiplication, while the latches 148 and 150 may be formed from TTL type 74LS273 integrated circuits and the adders 143 and 144 may be formed from TTL type 74LS283 integrated circuits.

The values $x_{Ip}$ and $y_{Ip}$ are fed to the interpolator 8 to enable the signal from the picture source to be interpolated as required before being applied to the frame store 10.

Figure 14:
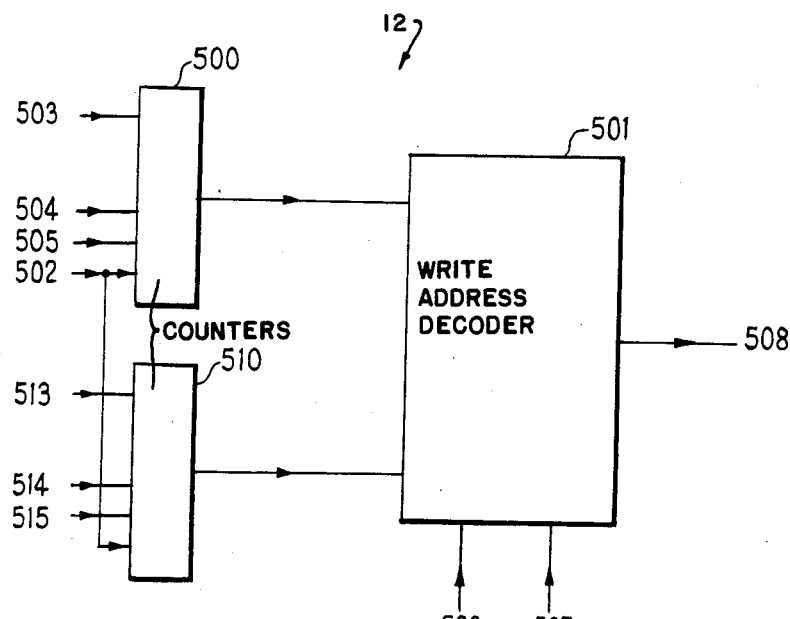
FIG. 14 shows an embodiment of a store write address generator suitable for use in the arrangement of FIG. 2.

The store write address generator 12 is shown in greater detail in FIG. 14. It comprises first and second up/down counters 500 and 510 which feed a write address decoder 501. The write address decoder 501 may comprise a read only memory which is programmed to convert the sequential addresses produced by the counters 500 and 501 to the address format of the frame store. The counters 500 and 501 have a clock input which is fed via a line 502 with the sample rate clock from the timing generator, presetting inputs which are fed via lines 503 and 513 from the outputs 75 and 85 respectively, of the hardware calculator 23. Increment/decrement and enable inputs are fed via lines 504, 514, 505 and 515 from the output 52 and 53 of the hardware calculator 23. The write address decoder 501 has two further inputs which are fed from the timing generator 24 via lines 506 and 507 and which indicate whether odd or even numbered samples are being stored and whether the areas of the store allocated to field 1 or field 2 of the interlaced fields are to be accessed. The output of the write address decoder 501 is fed to the frame store 10 via a line 508 to write samples produced by the interpolator 8 into the desired location in the store.

Figure 15:
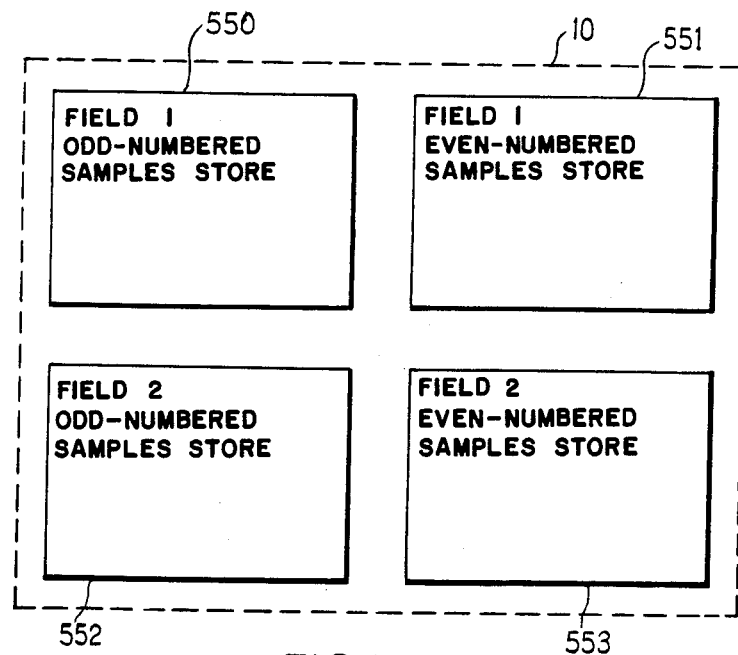
FIG. 15 illustrates diagrammatically, the organization of the frame store.

The store read address generator 14 may comprise a simple unidirectional counter combined with a read address decoder since the read addressing follows a constant regular sequence. However since the store 10 is arranged in four parts 550, 551, 552 and 553 as illustrated diagrammatically in FIG. 15 it is convenient to read each of the four parts sequentially such that for field 1, which is stored in parts 550 and 551, all the odd numbered samples of a line are read from part 550, and then all the even numbered samples of a line are read from part 551. This sequence is continued until all the lines of field 1 have been read, and then the same sequence of actions is performed on parts 552 and 553 which store the odd and even numbered samples respectively of field 2. Consequently, the interleaving circuit 16 is required to interleave the odd and even numbered samples so that the correct sample scanning order can be recovered.

The interleaving circuit is similar to the splitting circuit in form, but instead of the odd and even outputs, has odd and even inputs, and instead of the video signal sample input, has a video signal sample output. Odd numbered samples are read into stores by an address generator operating at the sample rate and with the least significant address bit held low. Even numbered samples are read into the stores by the address generator operating at the sample rate, but with the least significant address bit held high. The samples are read out by the address generator operating at half the sample rate. The samples are interleaved by applying complementary signals to the least significant address bit of the stores, the complementary signals changing at the sample rate.

The arrangement described thus far relates to the luminance channel of the video signal, the chrominance information is coded in a separate channel comprising two color difference components Cr and Cb which are also encoded as 8 bit samples, but at a sampling rate of 6.75 MHz. However, the two components Cr and Cb are interlaced to form a single channel with a sampling rate of 13.5 MHz. Thus, it can be seen that the Cr and Cb components form the odd and even numbered samples in each line. Thus the Cr component may be considered as the odd (or even) numbered samples. The chrominance channel then takes the same form as the luminance channel except that the interpolator 8 is arranged to interpolate only between the Cr samples or the Cb samples, i.e. no interpolation takes place between Cr and Cb samples. Consequently, it is not necessary to have Cr and Cb samples continuously present at the interpolator input which results in a simpler implementation of the interpolator in the chrominance channel.

Figure 16:
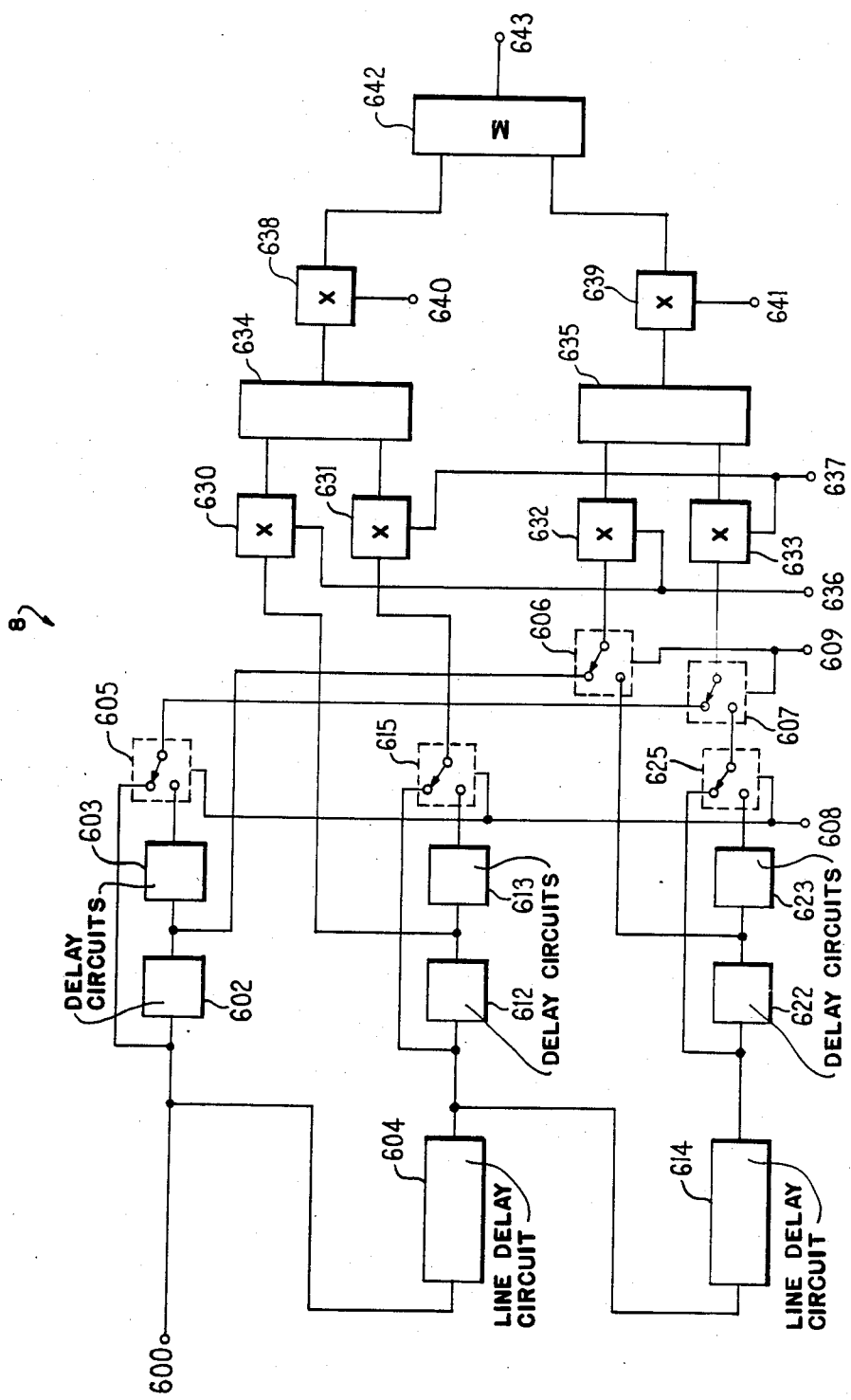
FIG. 16 shows an embodiment of an interpolator suitable for use in the color difference component channel.

FIG. 16 shows an interpolator suitable for use as the interpolator 8 in the chrominance channel. The interpolator shown in FIG. 1B has an input 600 for receiving input video samples representing the chrominance components Cr and Cb. Input 600 is connected to the input of a first of two serially connected one element delay circuits 602 and 603, to the input of a one line delay circuit 604 and to a first input of a changeover switching arrangement 605. The output of the second one element delay circuit 603 is connected to a second input of the changeover switching arrangement 605 while the output of the first one element delay circuit 602 is connected to a first input of a changeover switching arrangement 606. The output of the one line delay circuit 604 is connected to the input of a first of two serially connected one element delay circuits 612 and 613, to a first input of a changeover switching arrangement 615 and to the input of a one line delay circuit 614. The output of the first one elemet delay circuit 612 is connected to a first input of a multiplier circuit 630 while the output of the second one element delay circuit 613 is connected to the second input of the changeover switching arrangement 615. The output of the one line delay circuit 614 is connected to the input of a first of two serially connected one element delay circuits 622 and 623 and to a first input of a changeover switching arrangement 625. The output of the first one element delay circuit 622 is connected to a second input of the changeover switching arrangement 606 while the output of the second one element delay circuit 623 is connected to a second input of the changeover switching arrangement 625. The outputs of the changeover switching arrangements 605 and 625 are connected to first and second inputs of a changeover switching arrangement 607. The outputs of the changeover switching arrangements 615, 606 and 607 are connected to first inputs of respective multiplier circuits 631, 632, and 633. An input 608 is connected to control inputs of the changeover switching arrangements 605, 615, and 625 while an input 609 is connected to control inputs of the changeover switching arrangements 606 and 607.

The outputs of the multiplier circuit 630 and 631 are connected to first and second inputs respectively, of a summing circuit 634 while the outputs of multiplier circuits 632 and 633 are connected to first and second inputs respectively, of a summing circuit 635. An input 636 is connected to second inputs of the multiplier circuits 630 and 632 while an input 637 is connected to second inputs of the multiplier circuits 631 and 633. The output of the summing circuit 634 is connected to a first input of a multiplier 638 while the output of the summing circuit 635 is connected to a first input of a multi-plier 639. An input 640 is connected to a second input of the multiplier 638 while an input 641 is connected to a second input of the multiplier 639. The outputs of the multiplers 638 and 639 are connected to first and second inputs respectively, of a summing circuit 642 whose output is connected to the output 643 of the interpolator.

Since the arrangement stores alternate input samples in each of two cycles for each input line scan, it is arranged to store all the Cr components in one cycle and all the Cb components in the other cycle. Thus in one cycle, Cr components are fed to the input 600 at the sampling rate fy and interpolation between successive samples and successive lines carried out under control of signals applied to inputs 608, 609, 636, 637, 640 and 641. In the other cycle, Cb components are fed to the input 600 at the sampling rate fy and interpolation between successive samples and successive lines is again carried out under the control of signals applied to inputs 608, 609, 636, 637, 640, and 641. The signals on inputs 608 and 609 select the samples between which interpolation is to take place while the signals on lines 636, 637, 640 and 641 determine the proportions of each selected sample fed to the output. It should be noted that for inputs 636, 637 and 640, 641, the following relationship holds: $A = 1 - B$ where A is the value of input 636 or 640 and B is the value of input 637 or 641. Inputs 636 and 637 control the interpolation between successive samples in a line while inputs 640 and 641 control the interpolation between successive lines.

I claim:

1. Apparatus for processing input video signals having the form of digitally encoded samples and being arranged so that sucessive samples produce a television picture on a display screen by line and field sequential scanning: the apparatus comprising a field store; a first address generator for generating a set of addresses for adressing memory locations in the field store, the set of addresses being generated from input signals defining a given geometrical modification of the television picture represented by the input video signal samples; an interpolator for receiving said input video signals and producing interpolated samples in response to said input signals defining the given geometrical modification, said first address generator being effective to assign to each interpolated sample, one of said memory locations indicated by one of said addresses of said set of addresses; and a second address generator for generating addresses of at least a selected part of the field store to enable said interpolated samples to be read from the locations of the selected part of the field store to form a series of video signal samples which represent a modified television picture: characterized in that said apparatus further comprises a sample generator for producing, from the input video signal samples, samples which occur at twice the rate at which samples are written into the field store, and means for suppling the generated samples to the interpolator twice in each input line scanning period, that the field store comprises at least two parts, a first part for storing odd numbered samples of each output video line of a field and a second part for storing even numbered samples of each output video line of the field; that said set of addresses generated by said first address generator comprises a first sub-set which assigns said interpolated samples to the first part of the field store and a second sub-set which assigns said interpolated samples to the second part of said field store; and that said apparatus still further comprises means for supplying to an output said sucessive samples read from locations of the field store indicated by the second address generator such that said successive samples at the output are derived alternately from the first part and the second part.

2. Apparatus as claimed in claim 1, characterized in that said sample generator comprises a selection unit having an input for receiving said input video signal samples, a first output at which the odd numbered samples of each line are produced and a second output at which the even numbered samples of each line are produced, the samples at the first and second outputs being produced at the same rate as the samples applied to the input.

3. Apparatus as claimed in claim 2, characterized in that said selection unit comprises first and second sample memories, address generation means for generating addresses for assigning said input video signal samples to successive locations of the first and second memories, said address generation means being arranged to select the odd numbered sample locations only from the first sample memory and the even numbered locations only from the second sample memory, said odd and even numbered locations being read in parallel and at the input signal sample rate, the output of the first sample memory being connected to the first output of the selection unit and the output of the second sample memory being connected to the second output of the selection unit.

4. Apparatus as claimed in claim 2 or claim 3, characterized in that the interpolator has first and second inputs connected to the first and second outputs of the selection unit respectively, said interpolator being provided with first means for selecting the samples applied to the first input samples required to perform the interpolation, second means for selecting from samples applied to the second input samples required for the interpolation and means for interpolating between the samples selected by the first and second selecting means.

5. Apparatus as claimed in any one of claim 1–3, characterized in that the television picture comprises first and second interlaced fields and that a separate field store is provided for each field, each field store having said first and second parts.

6. Apparatus as claimed in any one of claims 1–3, characterized in that said means for supplying samples to the output comprises an interleaving unit which interleaves samples read from the first and second parts of the field store to produce successive samples at the output which samples are derived alternately from the first and second parts of the field store.

7. Apparatus as claimed in claim 6, characterized in that the interleaving unit has a first input for receiving samples read out from the first part of the field store, a second input for receiving samples read out from the second part of the field store and an output which the interleaved samples become available.

* * * * *